May 28, 1968 N. B. BACH 3,385,439
SEDIMENTATION METHOD AND APPARATUS
Filed June 7, 1966
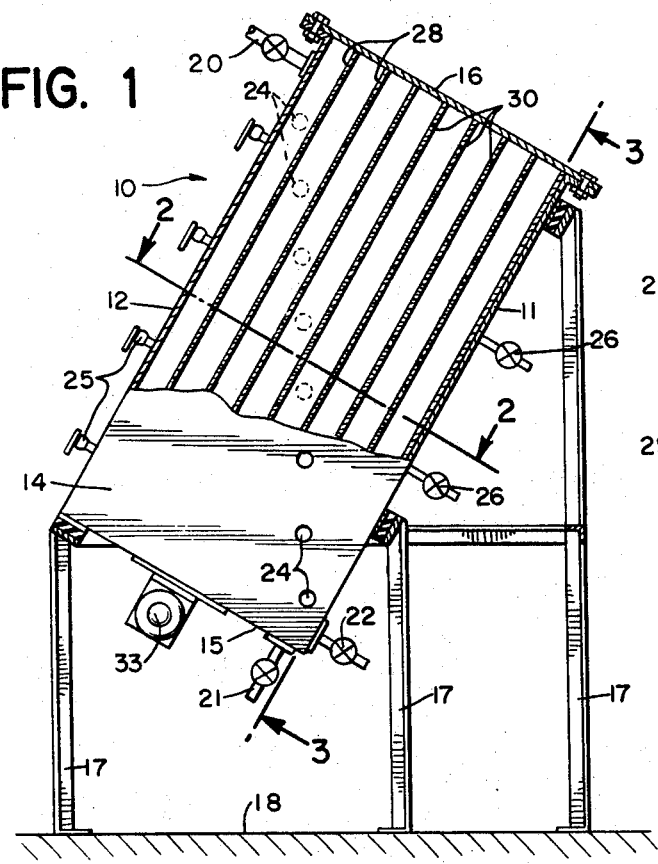
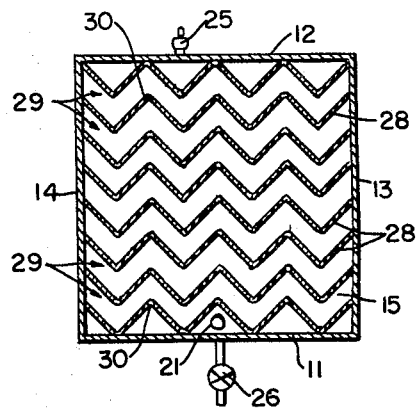
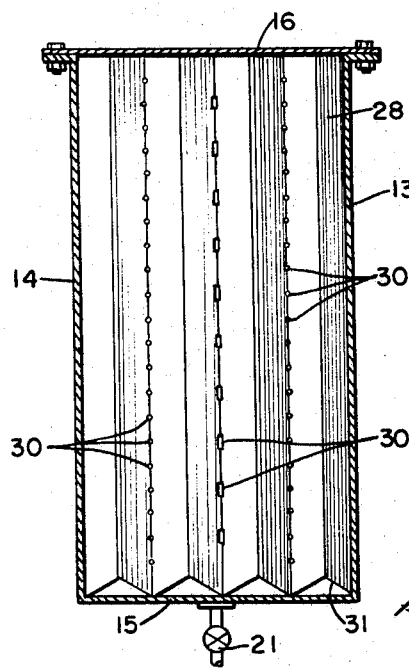
INVENTOR
NIELS B. BACH
BY
ATTORNEYS United States Patent Office 3,385,439
Patented May 28, 1968

3,385,439
SEDIMENTATION METHOD AND APPARATUS
Niels B. Bach, Rte. 2, Box 255,
North Fort Myers, Fla. 33903
Filed June 7, 1966, Ser. No. 555,879
6 Claims. (Cl. 210—83)

ABSTRACT OF THE DISCLOSURE

A liquid containing finely divided particles of matter suspended therein is clarified by establishing a quiescent body of the liquid in a settling vessel provided with a plurality of closely spaced, inclined corrugated settling surfaces. Suspended matter settles on the sloping side walls of each V-shaped corrugation and flows laterally and downwardly to the trough-like bottom of the corrugation where the settled matter joins a stream of similar settled matter flowing downwardly in the trough toward the bottom of the vessel. The peaks of the V-shaped corrugations are formed with small holes which permit clarified liquid to flow transversely across the tank without disturbing the settled matter in the troughs of the corrugations or at the bottom of the tank.

---

The principal purpose of most industrial sedimentation or settling operations is to clarify the liquid to the desired extent in the shortest possible time and to obtain the settled solid matter in as concentrated a form as possible. The time required to effect this purpose varies widely since the rate of settling is dependent (among other factors) upon the nature of the liquid medium, the nature and concentration of the suspended solid matter, the size and physical condition (i.e. whether dispersed or flocculated or both) of the solid particles, the size and character of the sedimentation tank etc.

The present invention invention is of special application in the sugar industry, particularly for clarifying liquids from suspended solids, such, for example, as are encountered in cane and beet sugar juices. In the generally prevailing intermittent or batch practice in cane sugar factories, the time required for the sedimentation of the so-called thin juice is usually from 1 to 2 hours. My observations lead me to believe that this comparatively long sedimentiation period is due, firstly, to the presence in the liquid of such a large amount of suspended matter that the particles, or flocs, tend to support each other to a certain extent and thereby retard the downward movement of the suspended solid matter, and secondly, to the small size of the solid particles suspended in the liquid. The first factor is especially evident in the later stages of the sedimentation operation when the concentration of suspended particles, or flocs, becomes so high that further settling can only take place by pressing liquid out of the concentrated solid matter, a step which takes more time than is usually available in commercial practice.

It is well recognized in the art that flocculation of the solid particles in sugar juice, as well as in other liquids, promotes sedimentation. Various methods and apparatus have been proposed for flocculating the solid particles suspended in a liquid and for increasing the size of the flocs by bringing them together. The most effective methods heretofore employed for this purpose involve some form of mechanical agitation, such as revolving propeller blades, rakes, paddles and the like, within the sedimentation tank itself, or in an auxiliary tank for pretreating the liquid preparatory to sedimentation.

In the course of an extended and exhaustive investigation, I have discovered that the flocculation of small solid particles and the building up of large easily settleable flocs from smaller flocs can be brought about by the action of gravity alone by providing within the body of liquid undergoing sedimentation a plurality of inclined and spaced settling surfaces in such a manner and in such a number as to divide all or part of the body of liquid into a number of shallow communicating settling zones where, due to the shallowness of the settling zones, solid matter flocculates and settles rapidly and, due to the inclination of the settling surfaces, flows downwardly over the settling surfaces. In the course of such downward flow the settled solid matter further flocculates and as a result moves more rapidly down the settling surfaces. Moreover, this downward flow of solid matter along the settling surfaces induces gentle movement or circulation of the liquid within each of the shallow settling zones, which movement promotes further flocculation and settling as finely suspended solid matter in all parts of the body of liquid are thereby brought in gentle contact with each other.

I have further found that it is advantageous to provide settling surfaces having relatively large surface areas, and to achieve this result I have investigated the feasibility of employing settling surfaces that are formed with a plurality of vertically oriented V-shaped corrugations that extend the full height of the settling surface. In the course of this investigation I made the surprising discovery that the use of such corrugated settling surfaces results in a much more rapid and efficient sedimentation of the suspended solid matter, with consequent clarification of the liquid, than can be attributed to the increase in surface area alone. Further investigation disclosed that the significant increase efficiency and rate of sedimentation results from the fact that the particles of solid matter in the liquid settle on the inclined sides of the V-shaped corrugations and thereupon move downwardly and transversely into the trough-like bottom of each V-shaped corrugation to join with other particles which collect and flow together in a relatively large stream relatively rapidly (as compared to the downward flow of particles along a flat or uncorrugated settling surface) to the lower end of the settling surface.

Based on the aforementioned investigations and discoveries I have devised an improved method and apparatus for clarifying liquids which contain fine particles of solid matter suspended therein. My new method, in its broad aspect, comprises permitting the particles of solid matter to settle from a quiescent body of the liquid undergoing sedimentation on to a plurality of closely spaced substantially parallel inclined settling surfaces disposed in and distributed throughout all or a substantial part of the body of liquid. The settling surfaces are disposed at and angle to horizontal such that solid matter settling thereon will flow downwardly over these surfaces under the influence of gravity, and preferably at an angle of about 60° to horizontal. Each settling surface is formed with a plurality of vertically oriented V-shaped corrugations that extend the full height of the settling surface and that are disposed substantially side by side across the width of the settling surface. The particles of solid matter settle on to the corrugated settling surfaces in the manner described, and on completion of the settling operation the clarified liquid relatively free of suspended solid matter is separated from the sludge-like liquid in the lower portion of the liquid body that now contains substantially all the settled solid matter.

The improved apparatus of my invention comprises a sedimentation tank adapted to contain a quiescent body of the liquid undergoing sedimentation, the tank being provided with liquid inlet means and with liquid outlet means adjacent the bottom thereof. A plurality of closely spaced substantially parallel settling surfaces are disposed in the tank at an angle to horizontal, advantageously at an angle of between about 70° and 50°, and preferably about 60°, with respect to horizontal. Each settling surface is formed with a plurality of vertically oriented V-shaped corrugations that extend the full height of the settling surface and are disposed substantially side by side across the width of the settling surface. The settling surfaces are preferably formed with a plurality of small openings whereby liquid contained in the settling zone, or space, between one pair of adjacent settling surfaces can flow into the settling zone, or space, between the adjoining pair of settling surfaces. Vibratory means for gently vibrating the tank and the settling surfaces therewithin, and means for determining the clarity of the liquid at various levels within the tank, are also advantageously provided. In use, the particles of solid matter in the liquid settle on the inclined sides of the V-shaped corrugations and thereupon move downwardly and transversely into the trough-like bottom of each V-shaped corrugation to join with other particles which collect and flow together in a relatively large stream relatively rapidly along the trough-like bottom well of the V-shaped corrugation to the lower end of each inclined settling surface.

My new method and apparatus for clarifying liquids containing suspended solid matter will be better understood from the following description, in conjunction with the accompanying drawings of which FIG. 1 is a side elevation, with one side wall broken away, of an advantageous embodiment of the sedimentation apparatus of my invention, FIG. 2 is a sectional view along line 2—2 of FIG. 1, and FIG. 3 is a sectional view along line 3—3 of FIG. 1.

The advantageous embodiment of the apparatus of my invention shown in the drawings comprises a generally rectilinear sedimentation tank 10 formed of sheet metal or the like and comprising a front wall 11, rear wall 12, right side wall 13, left side wall 14 (shown partly broken away in FIG. 1 of the drawing), bottom wall 15 and a removable, liquid-tight cover 16. The tank 10 is advantageously mounted at an angle to horizontal on the supporting frame 17 which is secured to the foundation structure 18. Valve controlled liquid inlet conduit 20 is provided adjacent the top of the tank 10 and valve controlled liquid outlet conduits 21 and 22 are provided adjacent the bottom of the tank. The side walls 13 and 14 are provided with a plurality of vertically spaced sight glasses or windows 24 which permit visual observation of the liquid contained within the tank at various levels, and the rear wall 12 is provided with a plurality of vertically spaced petcocks 25 which enables the operator to withdraw samples of the liquid contained within the tank at various levels. The front wall 11 of the tank 10 is advantageously provided with one or more vertically spaced valve controlled liquid discharge conduits 26 which permit clarified liquid to be withdrawn from the tank at several levels as hereinafter more fully described.

A plurality of closely spaced substantially parallel corrugated settling surfaces 28 formed of sheet metal or the like are disposed within the sedimentation tank 10. The settling surfaces 28 preferably are about 3 to 6 inches and seldom more than 12 inches apart and are disposed at an angle to horizontal so that pairs of adjacent settling surfaces define a plurality of inclined settling zones 29. The angle of inclination of the settling surfaces 28 is such that the solid matter settling thereon will flow downwardly over the surfaces under the influence of gravity, and accordingly they are advantageously disposed at an angle of between about 70° and 50° and, preferably at an angle of about 60°, with respect to horizontal. Each corrugated settling surface 28 is formed with a plurality of vertically oriented V-shaped corrugations as shown in FIG. 2 that extend the full height of the settling surface and that are disposed substantially across the width of the settling surface as shown in FIG. 3. A plurality of small openings 30 are formed in each of the settling surfaces 28, the openings 30 being widely distributed over the surfaces in order to permit liquid contained in the space or settling zone 29 between one pair of adjacent settling surfaces to flow relatively freely into the space or settling zone between the adjoining pair of adjacent settling surfaces. The openings 30 may be of any desired shape, and I have used circular openings approximately one inch in diameter and rectangular openings approximately one inch by three inches in length. The bottom edge of each settling surface is formed with openings or cut away portions 31 which permit the liquid in the bottom portion of the sedimentation tank 10 to flow freely to the liquid discharge conduits 21 and 22.

Pursuant to the practice of my invention, the liquid containing fine particles of solid matter undergoing sedimentation is introduced into the sedimentation tank 10 through the inlet conduit 20, and after the tank is filled a quiescent body of the liquid is established within the tank. The particles of solid matter suspended in the liquid settle on the inclined sides of the V-shaped corrugations formed in the settling surfaces 28, and the settled particles then move downwardly and transversely (or sideways) into the trough-like bottom of each inclined V-shaped corrugation to join with other particles which collect and flow together in a relatively large stream at a relatively rapid rate (as compared to the downward flow of particles along a flat or uncorrugated settling surface) to the lower end of the settling surface. As the sedimentation operation proceeds, the concentration of particles of solid matter in the upper portion of the liquid rapidly decreases while the concentration of solid particles in the lower portion of the liquid correspondingly increases until substantially all the solid particles are concentrated in a sludge contained in the lowest portion of the liquid. The progress of the sedimentation and clarification operation may be continuously checked by means of the sight glasses 24 and also by means of samples withdrawn through the petcocks 25. After satisfactory sedimentation and clarification has taken place, the sludge is withdrawn through the conduit 21 until clear liquid begins to be discharged therefrom. The valve controlled conduit 21 is then shut off and the clarified liquid is withdrawn through the conduit 22 until the tank is empty. Alternatively, instead of waiting until sedimentation of the entire body of liquid has been completed it is often convenient to commence discharge of the clarified liquid from the upper portions of the tank 10 within a few minutes after the tank has been filled. That is to say, the liquid in the upper portion of the tank 10 becomes clear within a few minutes after filling the tank, and in a very few minutes thereafter liquid deeper in the tank also clears up, the clarification of the liquid proceeding in this manner until sedimentation is complete. Accordingly, clarified liquid may be withdrawn successively from the upper and intermediate levels of the tank 10 through the valve controlled discharge conduits 26 as soon as the liquid becomes clarified to that particular level of the tank.

In some cases fine particles of solid matter may tend to stick to the corrugated settling surfaces 28 during the sedimentation operation. Accordingly, a small mechanical vibrator 33 is advantageously mounted on the tank 10, the vibrator 33 subjecting the tank and the setteling surfaces disposed therewithin to gentle high frequency vibrations so that the particles which may tend to stick to the inclined settling surfaces will be dislodged therefrom. This gentle vibration of the tank 10 and settling surfaces 28 in no way disrupts the essentially quiescent conditions established within the tank which are essential for satisfactory sedimentation in accordance with my invention.

The improved method and apparatus of my invention results in a dramatic increase in the speed and efficiency of sedimentation and clarification of liquids containing solid matter suspended therein. For example, in actual practice in the sugar industry it requires at least one hour and usually two hours or more to obtain satisfactory clarification of sugar juice in a conventional settling tank.

In contrast with this, the same volume of sugar juice will be clarified in the apparatus of my invention in a period of 15 to 30 minutes. Moreover, the practice of my invention not only reduces the time required for clarification but it also results in the production of a more concentrated sludge and a clearer liquid product. Furthermore, the shorter sedimentation time made possible by my invention decreases the sugar losses occasioned by inversion of sucrose.

From the foregoing description of my improved sedimentation method and apparatus for clarifying liquids it will be seen that I have made an important contribution to the art to which my invention relates.

I claim:

1. Method of clarifying liquids containing fine particles of solid matter suspended therein which comprises
   establishing an essentially quiescent body of the liquor to be clarified and maintaining the identity of said body substantially unchanged during the clarification operation,
   permitting the particles of solid matter to settle on to a plurality of closely spaced substantially parallel inclined settling surfaces disposed in the body of liquid an angle of between about 70 to 50° with respect to horizontal, each settling surface being formed with a plurality of vertically oriented V-shaped corrugations that extend the full height of the settling surface and that are disposed substantially side by side across the width of the settling surface, whereby the particles of solid matter in the liquid settle on the inclined sides of the V-shaped corrugations and thereupon move downwardly and transversely to the trough-like bottom of each V-shaped corrugation to join with other particles which collect and flow together in a relatively large stream relatively rapidly downwardly along the trough-like bottom of the V-shaped corrugation to the lower end of each inclined settling surface,
   permitting clarified liquid to move from the space between one pair of adjoining settling surfaces to the space between another pair of adjoining settling surfaces without disturbing the particles of settled solid matter flowing downwardly in the trough-like bottom of the V-shaped corrugations, and
   separating and recovering the clarified liquid relatively free of suspended solid matter that now comprises the upper portion of the quiescent body of liquid.

2. Method according to claim 1 in which the inclined settling surfaces are disposed at an angle of about 60° with respect to horizontal.

3. Apparatus for clarifying liquids containing fine particles of solid matter suspended therein which comprises
   a sedimentation tank adapted to contain a quiescent body of the liquid to be clarified, the tank being provided with liquid inlet means and with liquid outlet means adjacent the bottom thereof, said liquid inlet means and outlet means being provided with valve means for shutting off the flow of liquid into and from the tank,
   a plurality of closely spaced substantially parallel settling surfaces disposed in the tank at an angle of 70 to 50° with respect to horizontal, each settling surface being formed with a plurality of vertically oriented V-shaped corrugations that extend the full height of the settling surface and that are disposed substantially side by side across the width of the settling surface, the peaks of said V-shaped corrugations (as distinguished from the trough-like bottoms of said corrugations) being provided with small openings through which clarified liquid can flow without disturbing settled solid matters in the trough-like bottom of each corrugation,
   whereby the particles of solid matter in the liquid will settle on the inclined sides of the V-shaped corrugations and thereupon move downwardly and transversely to the trough-like bottom of each V-shaped corrugation to join with other particles which collect and flow together in a relatively large stream relatively rapidly downwardly along the trough-like bottom of the V-shaped corrugation to the lower end of each inclined settling surface.

4. The apparatus according to claim 3 in which the inclined settling surfaces are disposed at an angle of about 60° with respect to horizontal.

5. Apparatus according to claim 3 in which the tank is provided with vibratory means adapted, when activated, to gently vibrate the tank whereby fine particles adhering to the inclined settling surfaces are dislodged therefrom.

6. Apparatus according to claim 3 in which the tank is provided with a plurality of vertically spaced valve controlled liquid discharge conduits whereby the liquid contained therein can be withdrawn at several levels.

References Cited

UNITED STATES PATENTS

| 290,000 | 12/1883 | Detrick | 210—95 |
| 1,661,284 | 3/1928 | Fuqua et al. | 210—95 |
| 2,498,292 | 2/1950 | Naugle | 210—521 |
| 2,573,615 | 10/1951 | Seailles | 210—521 |
| 2,868,384 | 1/1959 | Puddington | 210—521 |

FOREIGN PATENTS

| 300,294 | 9/1917 | Germany. |
| 907 | 1/1886 | Great Britain. |

REUBEN FRIEDMAN, *Primary Examiner.*

SAMIH N. ZAHARNA, *Examiner.*

J. ADEE, *Assistant Examiner.*